March 10, 1959  C. B. TRIMBLE  2,877,015
CHECK FEEDING MECHANISM
Filed Nov. 13, 1956  5 Sheets-Sheet 1

INVENTOR,
CEBERN B. TRIMBLE
BY
HIS ATTORNEYS

March 10, 1959
C. B. TRIMBLE
2,877,015
CHECK FEEDING MECHANISM
Filed Nov. 13, 1956
5 Sheets-Sheet 2
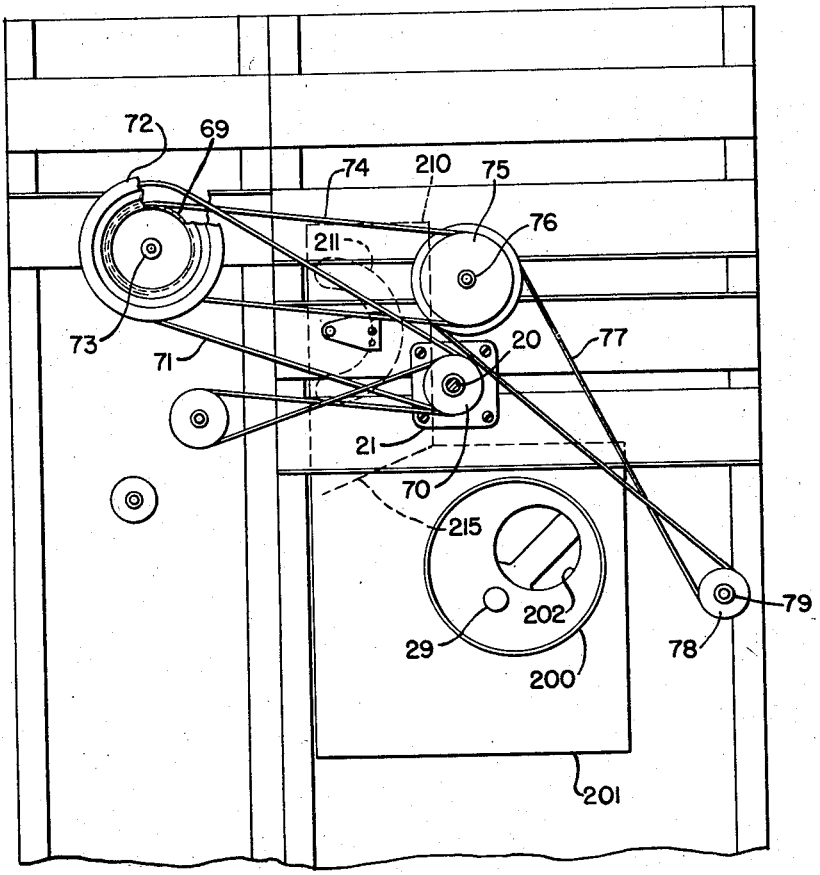
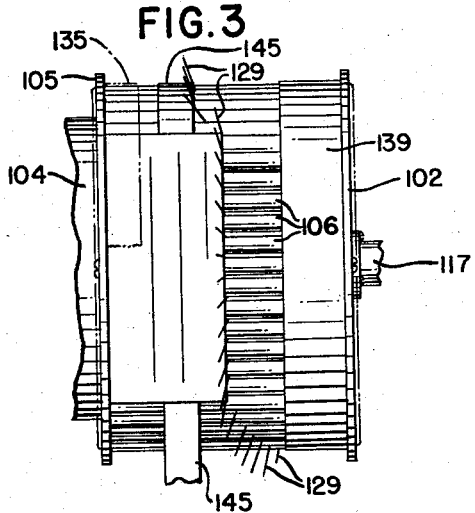
INVENTOR,
CEBERN B. TRIMBLE
BY
HIS ATTORNEYS

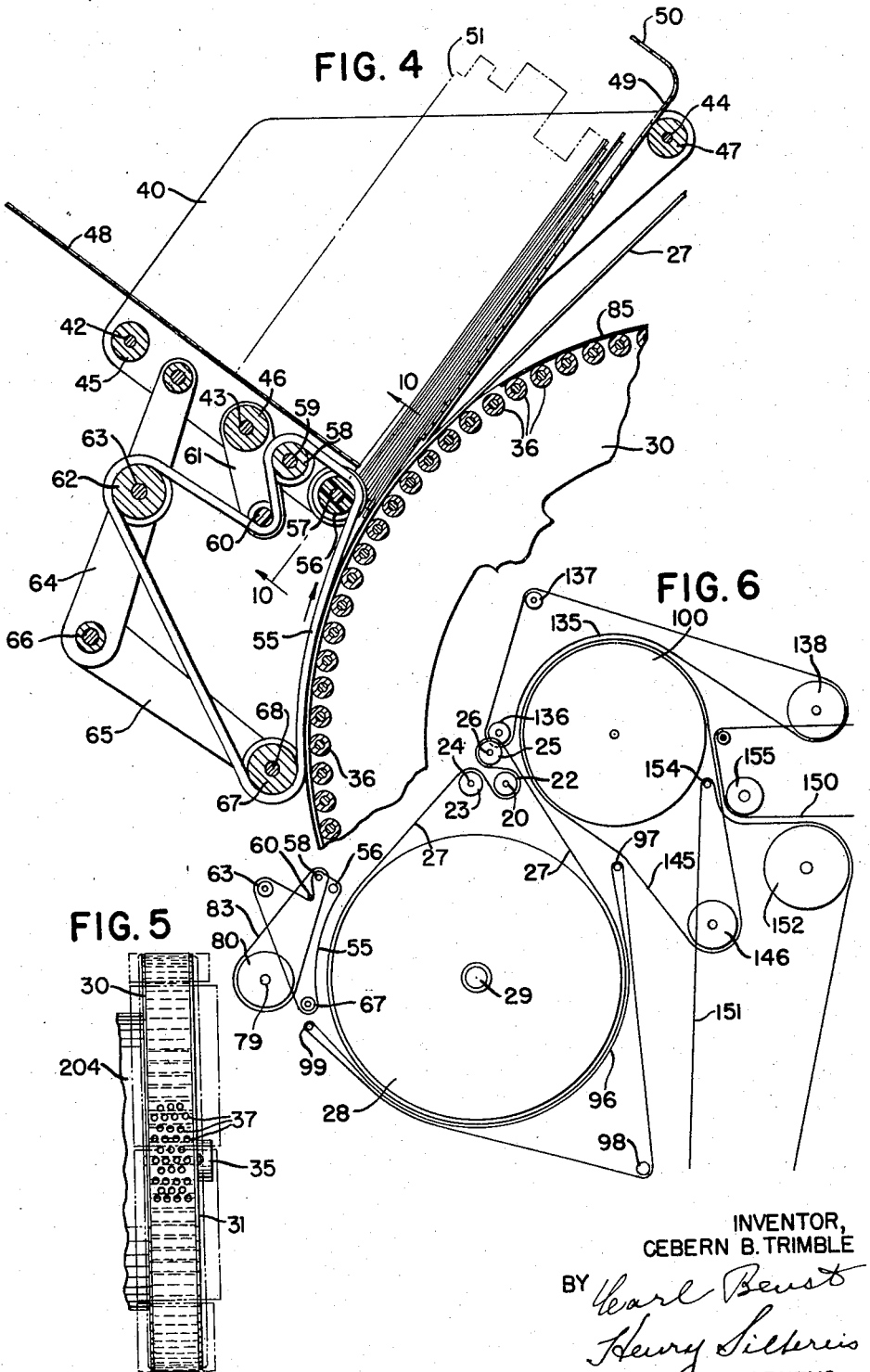

March 10, 1959 C. B. TRIMBLE 2,877,015
CHECK FEEDING MECHANISM
Filed Nov. 13, 1956 5 Sheets-Sheet 4
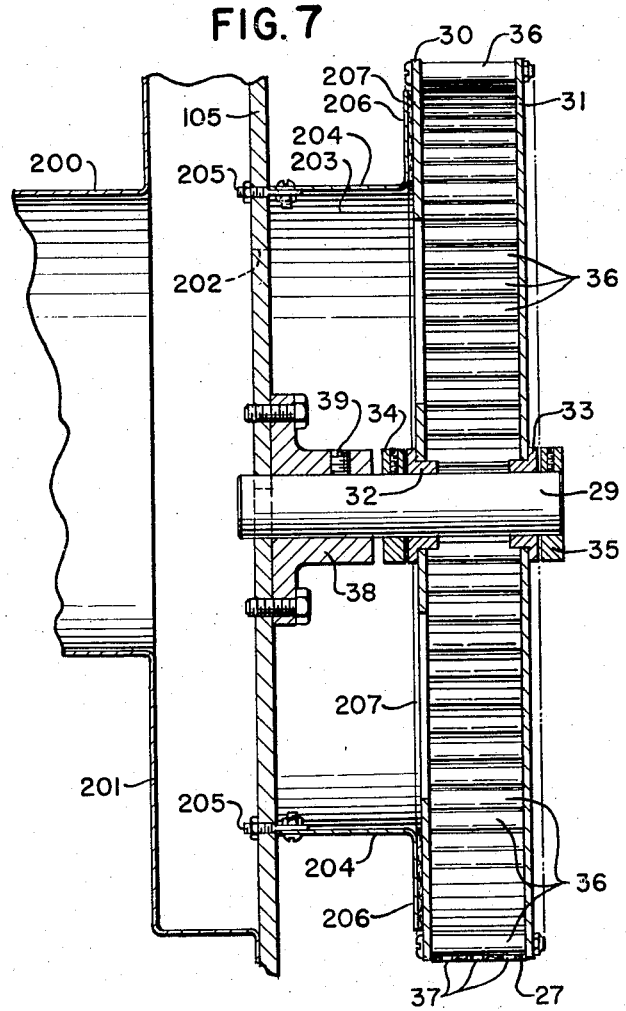
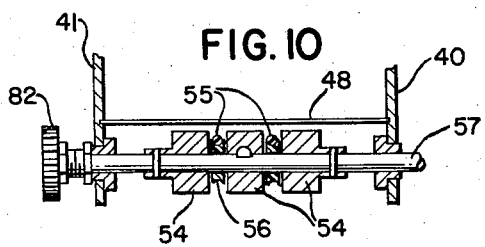
INVENTOR,
CEBERN B. TRIMBLE
BY
HIS ATTORNEYS March 10, 1959  C. B. TRIMBLE  2,877,015
CHECK FEEDING MECHANISM
Filed Nov. 13, 1956  5 Sheets-Sheet 5

INVENTOR,
CEBERN B. TRIMBLE
BY
HIS ATTORNEYS

United States Patent Office 2,877,015
Patented Mar. 10, 1959

2,877,015

CHECK FEEDING MECHANISM

Cebern B. Trimble, Dayton, Ohio, assignor to The National Cash Register Company, Dayton, Ohio, a corporation of Maryland Application November 13, 1956, Serial No. 621,740

13 Claims. (Cl. 271—13)

The invention relates to improvements in check feeding and alining mechanisms.

The object of the invention is to provide a check feeding mechanism which is adapted to feed checks of miscellaneous sizes and lengths from a hopper, past an identification pick-up head and into selected hoppers whereby the checks are sorted according to the data picked up by the pick-up head.

A feature of the invention is the provision of a novel alining means whereby the checks are accurately alined in respect to the pick-up head so that coded data on the checks can be picked up by the pick-up head and route the check into an associated compartment.

An important feature of the invention is to feed the checks out of the hopper one at a time with no spacing between the checks, no matter how long or short the checks are, and in what sequence they are fed from the hopper.

The invention also includes two oppositely moving belts at the mouth of the hopper between which the checks move when leaving the hopper, the top belt prevents more than one check from being fed out of the hopper at one time, the bottom belt having a greater coefficient of friction than the top belt, and the top belt returns all but the bottom check toward the hopper.

Another object of the invention is to apply a vacuum to the feeding belt whereby the check is held on the belt during its feeding movement.

With these and incidental objects in view, the invention includes certain novel features of construction and combinations of parts, a preferred form or embodiment of which is hereinafter described with reference to the drawings which accompany and form a part of this specification.

Of said drawings:

Fig. 2 is a rear elevational view of means for driving the feeding mechanism.

Fig. 3 is a detail view showing the check alining mechanism looking from the top of the machine.

Fig. 4 is an enlarged detail view showing the means for feeding the checks from a storage hopper, together with the means for preventing more than one check being fed from the hopper at the same time.

Fig. 5 is a detail view of the transport drum, illustrating the air ports in the feeding belt, by means of which the checks are held on the belt by vacuum.

Fig. 6 is a diagrammatic view of the various belts for feeding the checks.

Fig. 7 is a detailed sectional view of the transport drum taken on lines 7—7 of Fig. 1.

Fig. 10 is a sectional view taken on line 10—10 of Fig. 4.

*General description*

Figure 1:
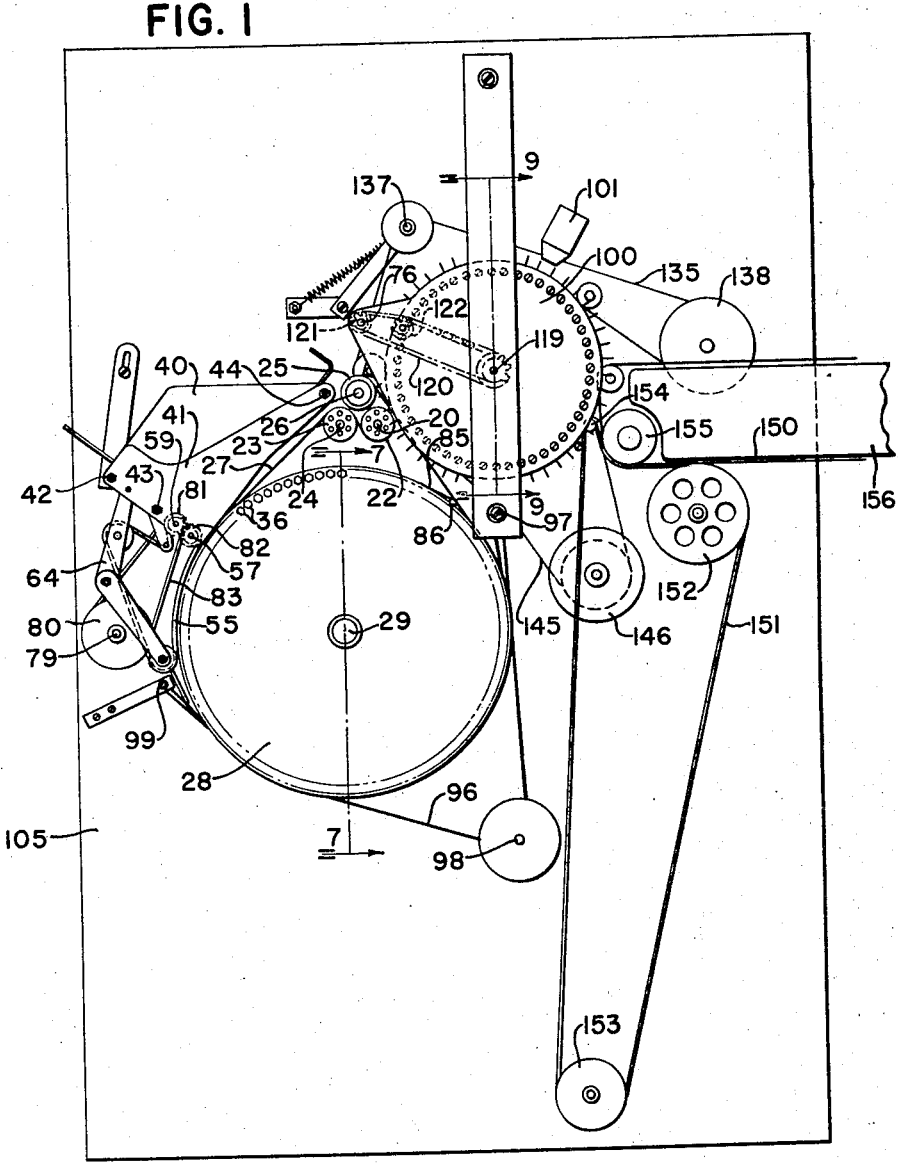
Fig. 1 is a front elevational view of the check feeding mechanism.

The invention comprises a high-speed feeding means to feed business forms, such as checks, from a hopper past an electronic pickup head, and into sorting compartments. The feeding mechanism is such that miscellaneous sizes, that is, lengths and widths, can be inserted into a hopper and the forms thereafter fed from the hopper one at a time in rapid succession. The ends of the forms being fed overlap a small extent and this small overlap is always the same no matter what the lengths of the forms being fed are.

The constant overlapping of various forms is accomplished by feeding the forms out of the hopper by use of vacuum, which is applied through a drum and through a feed belt having perforations therein to permit the passage of air through, and to communicate with the vacuum drum.

To prevent more than one form from being fed off the bottom of the stack in the hopper, a pair of round belts moving in a direction opposite the movement of the feeding belt returns all but the bottom form into the hopper. These return belts are made of a material with a high coefficient of friction to paper. The air holds the lower form against the feed belt while the return belt restores the upper form into the hopper, the force of the air holding the lower forms being powerful enough to overcome the force of friction between the forms.

Before the forms reach the pick-up head for analyzing the data thereon, they are properly aligned by a novel alining drum.

The alining drum is provided with a plurality of wires spaced around the axis of the drum. The wires are flexible and are mounted at an angle to the rotation of the drum. As the drum and wires rotate together, the wires successively move toward an alining surface, against which the forms are pressed by the wires. Since the forms are held against the periphery of the drum in a curved position around the drum, added strength is given to the forms when pushed against the alining force by the wires.

*Detailed description*

The mechanism is operated through a main shaft 20, which is rotated by a motor, not shown. The main shaft 20 is rotatably mounted in a pair of bearings, such as the bearing 21, shown in Fig. 2. Secured to the shaft 20 (Fig. 1) is a pulley 22, which pulley is rotated in a clockwise direction when operated by the motor, or any other power source. Associated with the pulley 22 is a pulley 23, mounted on a stud 24, and a second pulley 25 mounted on a stud 26. The studs 24 and 26 are carried by a frame 105 of the machine.

A transport belt 27 (Figs. 1, 4, 5, 6 and 7), is wound around the pulley 22, and over the pulleys 23 and 25, respectively. The transport belt 27 passes around a transport drum 28 (Fig. 1) rotatably mounted on a stud 29, supported in a bearing 38 carried by the frame 105 (Fig. 7). The belt 27 passes from around the pulley 23 around the transport drum 28, and over the pulley 25 back around the pulley 22 to the pulley 23.

The transport drum 28 comprises a back plate 30 (Fig. 7), which is spoked to provide openings for air passage from the air supply, to be later described. The transport drum is also provided with a front plate 31, which is a solid disk. The plates 30 and 31 are provided with bearings 32 and 33, respectively, which provide means for rotating the plates 30 and 31 on the stud 29, the stud 29 being held in the bearing 38 by a set screw 39. Set collars 34 and 35 are provided to maintain the drum in its proper alinement. Set screws are provided for maintaining the collars 34 and 35 in position on the shaft 29.

The peripheries of the plates 30 and 31 are connected by a plurality of rollers 36, which are closely spaced around the entire periphery of the drum, thus providing space for air to be drawn between the rollers 36, in a manner hereinafter described.

The transport belt 27 passes around and contacts the rollers 36, and this belt is provided with openings 37 (Fig. 5) throughout its entire length.

Rotation of the shaft 20 by the power source, such as an electric motor (not shown), rotates the belt 27, together with the drum 28, in a counterclockwise direction (Fig. 1). At this time the air is applied to the inside of the drum 28 and drawn through the spaces between the rollers 36, thus pulling on the lowermost check in the hopper from the bottom of the stack of checks.

The check receiving hopper is provided with a back plate 40 (Figs. 1 and 4) and a front plate 41. The front and back plates are connected by studs 42, 43, and 44, spacing sleeves 45, 46 and 47, respectively, mounted on the studs 42, 43 and 44, respectively, to properly space the plates 40 and 41. A side plate 48 mounted in slots in plates 40 and 41 (Fig. 10), provides a closure and a support against which the stack of checks may rest. A bottom plate 49 is provided, which is slidably supported in slots formed in the inner walls of the plates 40 and 41, and also rests on the spacing sleeve 47. The plate 49 is slightly wider than the space between the slots in the plates 40 and 41, and is bent slightly before it is assembled in the slots, thus providing a tension therein to hold the plate 49 in place. The bottom plate 49 is bent at right angles to form a flange 50, providing a limiting member for the hopper. The plate 49 is adjustable to vary the length of the opening through which the checks are fed. This construction provides means for varying the opening to compensate for checks printed on various thicknesses of paper stock. Thin stock can be fed out of the hopper with less exposed to air than thick stock.

A stack of checks or other forms to be sorted are positioned on the bottom plate 49 and the stack may comprise checks of varying lengths and widths as indicated by the chain line 51 (Fig. 4).

Means may be provided for vibrating the side plate 48 so as to jog the stack of checks 51 against the plate 48. Such a jogging means may comprise a solenoid, which is connected to operate on the plate 48, or it may be in the form of a mechanical device, comprising a cam for vibrating the plate 48.

As the transport belt 27 moves in a counterclockwise direction (Fig. 4) there is a possibility of withdrawing more than one check from the bottom of the stack 51. To restore all but the lowermost check into the hopper, a pair of round restoring belts 55 (Fig. 4) are provided. The restoring belts 55 are located in respect to the transport belt 27 so that single checks may pass between them, and if more than one check starts down, the belts 55 will restore all but the lowermost check back into the hopper, where the check remains until the lowermost check is entirely withdrawn, and the air passing between the rollers 36 is then effective to attract the next check.

It should be noted at this time that there is no particular cycle in feeding the checks from the hopper inasmuch as the only controlling element is the release of the lowermost check to the action of the air. As a matter of fact, the succeeding check may start out of the hopper before the first check is completely out, thus having a slight overlap of the checks as they feed around the transport belt 27.

This slight overlap would be uniform in all cases, no matter what the length of the checks may be. A short check may follow a long one, or a long check may follow a short one. In each case this slight overlap would be the same.

The restoring belts 55 are guided around pulleys 56, mounted on a short shaft 57, carried by the plates 40 and 41 of the hopper. From the pulleys 56, the restoring belts pass over pulleys 58, rotatably mounted on a shaft 59, carried by the plates 40 and 41. From the pulleys 58 the restoring belts 55 pass around rollers 60, supported by a pair of arms 61, carried on the stud 43. From the rollers 60 the restoring belts 55 pass over pulleys 62, rotatably mounted on a shaft 63, carried by a pair of arms 64. The arms 64 are connected to a pair of arms 65, which are mounted on a shaft 66. The connection between the arms 64 and 65 is friction-held, so that the arms 65 can be adjusted in relation to the arms 64 to adjust a pair of rollers 67 carried by a stud 68 supported by the two arms 65. By changing the angle between the arms 64 and 65, the proper tension is maintained on the belts 55.

The belts 55 are driven by the main shaft 20 on which is mounted a pulley 70 (Fig. 2). The pulley 70 drives a belt 71, passing over a pulley 72, which is one of a cluster of pulleys, mounted on a shaft 73 carried by the frame 105. Passing over a pulley 69, of said cluster of pulleys, is a belt 74, which passes over a pulley 75 on shaft 76. Thus the pulley 69 rotates the pulley 75 by means of the belt 74. Also passing around the pulley 75 is a belt 77, which passes over a pulley 78 carried on a shaft 79. Also mounted on the shaft 79 (Fig. 1) is a pulley 80, having a belt 83 passing over it and over a pulley (not shown) mounted on the shaft 59.

When the main shaft 20 is rotated, the belt 71 drives the pulley 72, which in turn drives the pulley 69, the belt 74, and the pulley 75 on shaft 76. The pulley 75, through the belt 77, rotates the shaft 79, and the shaft 79 rotates the pulley 80 to rotate the shaft 59 to move the restoring belts 55 toward the hopper to restore whichever checks above the lowermost may have started to feed out of the hopper, and thereby restore these checks back into the hopper.

Secured to the shaft 59 is a pinion 81 (Fig. 1) which meshes with a pinion 82 secured to shaft 57. Also secured to the shaft 57 is a plurality of rollers 54 (three shown in Fig. 10). The rollers 54 are of such a diameter that the peripheries thereof extend above the round belts 55, and they lie in the path of the stack of checks 51 as shown in Fig. 4.

The pinions 81 and 82 rotate the rollers 54 clockwise (Fig. 4), whereas the belts 55 move counter-clockwise. Thus the rollers 54 tend to move the checks out of the hopper, while at the same time holding them out of contact with the belts 55, to permit the belts 55 to restore the checks, not held by vacuum, back into the hopper.

The pair of round restoring belts 55 (see Fig. 10) are mounted side by side, and spaced to contact the checks near the center thereof.

As may be observed by referring to Fig. 1, the space on the periphery of the transport drum 28, between the points of tangency, where the belt 27 contacts the transport drum, the space between the rollers 36 would be open to atmosphere, and therefore, sufficient air could be drawn through these spaces to render the transport action of the air negative. To close the spaces between the rollers 36, between the points of tangency of the belt 27 on the transport drum 28, a metal band 85 is provided, which lies over the rollers 36, and as the air is drawn into the transport drum, these openings are closed by the band 85. The band 85 is supported on a rod 86.

To seal holes in the transport belt 27 below the transport drum, a band 96 is provided, which is guided around the transport belt by passing over three studs 97, 98, and 99. The band 96 closes the holes in the transport belt below the drum 28 to permit the vacuum to apply full pressure to the checks as they are moved out of the hopper.

Figure 8:
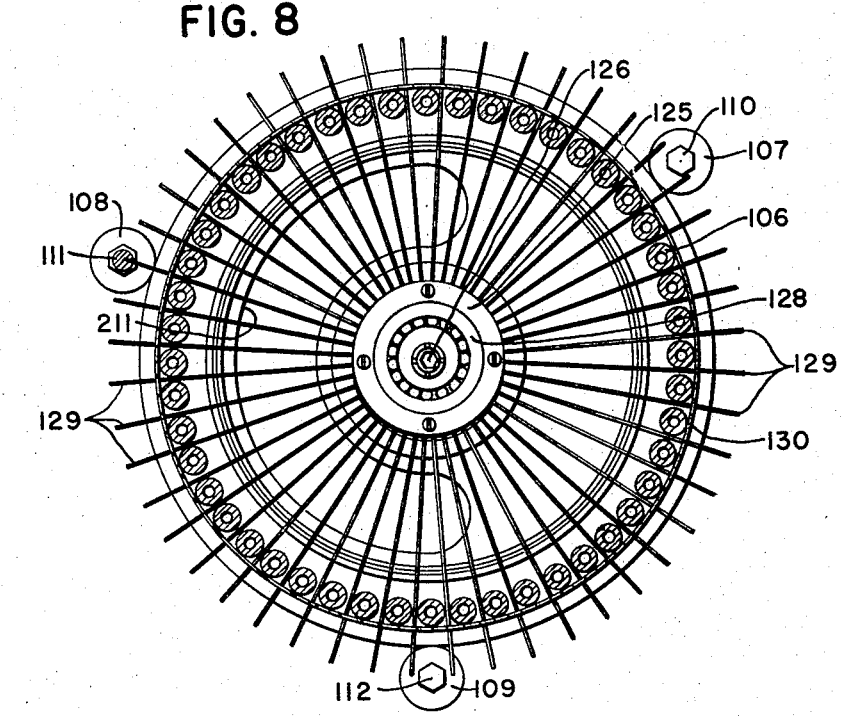
Fig. 8 is an enlarged view of the check alining mechanism shown in cross section, and taken on line 8—8 of Fig. 9 and looking in the direction of the arrows.

From the transport belt 27 the checks are transferred to an alining drum 100 (Figs. 1, 8 and 9) where the checks are properly alined with respect to a pickup device 101, which controls a mechanism to determine into which compartment the check is to be sorted. The sorting mechanism is not described herein. The alining drum 100 is also connected to the source of vacuum, and the air is used to attract the check from the transport belt 27 to the alining drum 100. The alining drum 100 (Figs. 8 and 9) is provided with a front plate 102 and a ring 103, which ring is rotatably mounted on a bearing 104 carried by the main frame 105 of the machine. The front plate 102 and the ring 103 are connected by a plurality of sleeves 106, spaced around the peripheries thereof.

The ring 103, in addition to being rotatably mounted on the bearing 104 is supported by three rollers 107, 108, 109, carried by studs 110, 111 and 112, respectively. The studs 110, 111 and 112 are carried by the main frame 105. Each stud 110, 111 and 112 is provided with a stud 113, radially mounted thereon, and upon each of which is mounted a roller 114, bearing against the back side of the ring 103. The front plate 102 is provided with a bearing 115, in which is secured a short shaft 116. The shaft 116 is provided with a recess into which fits a roller 131, carried by a thrust bearing 117, mounted in the front frame 118 of the machine. The bearing 117 is adjustable to maintain the ring 103 against the rollers 114. Secured to the shaft 116 is a chain sprocket 119, which is engaged by a chain 120, also engaging a sprocket 121 on a before mentioned shaft 76. An intermediate sprocket 122 supports the chain 120.

When the main shaft 20, through the belts above described, rotate the shaft 76, the sprocket 121, through a chain 120 and sprocket 119, rotates the alining drum in a clockwise direction (Fig. 1). It may be noted here that the speed of rotation of the alining drum 100 is faster than the rotation of the transport drum 28, so that the checks being transported are spaced slightly on the alining drum 100.

Mounted on the main frame 105 is a bearing 125, supporting a stud 126. The free end of the stud 126 is formed in the shape of a ball 127, on which is supported a ball bearing 128. The ball bearing is mounted on an angle, as illustrated in Fig. 9, and the outer ring of the ball bearing is provided with a plurality of spring wire arms 129.

Figure 9:
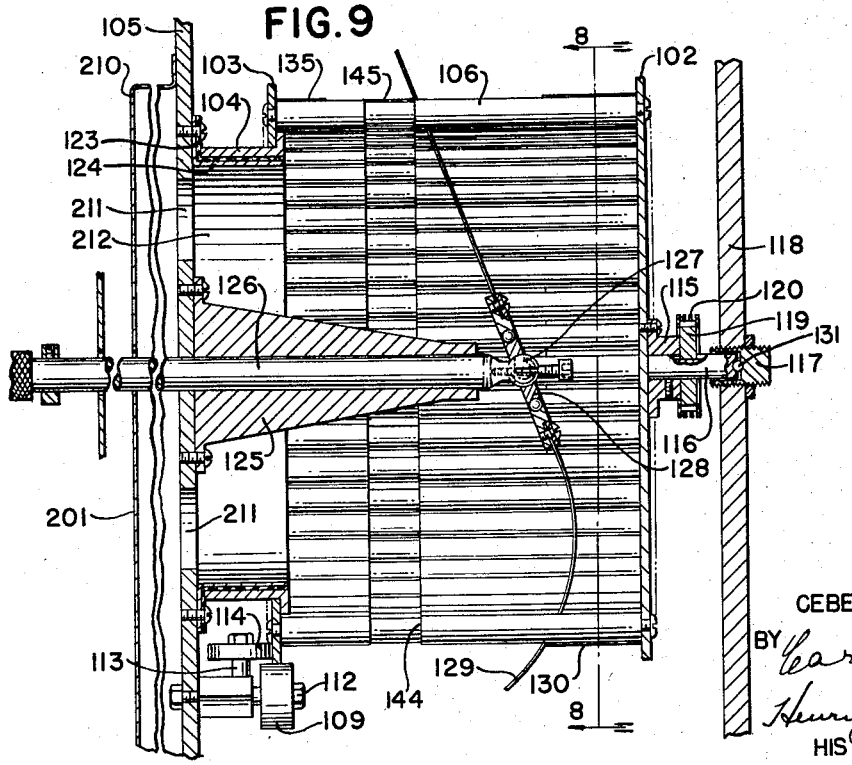
Fig. 9 is an enlarged detail view of the check alining mechanism taken on lines 9—9 of Fig. 1.

When the spring wire arms 129 are in lowermost position (Fig. 9) they bear against and flex on a band 130, mounted on the alining drum in the manner illustrated in Fig. 9. The spring wire arms project between adjacent sleeves 106, and there is a spring wire arm 129 provided between each pair of sleeves 106, thus providing a plurality of spring wire arms, as clearly illustrated in Fig. 8. Since the spring wire arms 129 project between the sleeves 106, the wires are carried with the drum as the drum is rotated. Since the ball bearing 128 is mounted at an angle on the stud 126, each arm 129 gradually moves toward the left (Fig. 9) as the drum rotates, until it reaches the top position, whereupon the spring wire arms gradually recede to the position shown at the bottom of Fig. 9. As the checks enter and are attracted to the alining drum by vacuum, and are rotated therewith, the spring wire arms 129, gradually moving towards the checks, and force the checks against the inner wall of the ring 103, thus properly alining the checks in relation to the pickup device 101. A belt 135 is guided around the alining drum 100, and the check is fed between this belt 135 and the drum. The belt 135 passes around pulleys 136, 137 and 138. The belt 135 is provided to maintain the check in contact with the alining drum.

In order to strip the check from the alining drum, after the check has passed the pickup head 101, and is ready to be moved into the sorting mechanism, a stripping band 145 (Figs. 1 and 9) is provided. The band 145 is made of thin stainless steel and passes around a pulley 146, and around the alining drum 100. The sleeves 106 are recessed at 144 to receive the band 145 which recess is deep enough to permit the outer surface to be located beneath the outer diameter of the sleeves so that the checks can pass freely on the band. As a check is transferred from the transport belt 27 to the alining drum 100, the check passes over the outside of the stripping band 145, as shown in Fig. 3. Thus as the check passes the pickup head 101 and down the righthand side of the drum, as shown in Fig. 1, the band 145 strips the check from the alining drum and passes it on to a sorting belt 150. When passing to the sorting belt 150, the check passes between this belt 150 and a second belt 151. The belt 151 passes over a pulley 152, and around an idler pulley 153 and over a pulley 154. From there it passes around a feed roller 155 for the sorting belt 150. The check is held on the under sides of the belt 150 by suction provided by a suction chamber 156 (Fig. 1) connected to the source of vacuum. The sorting belt 150 feeds the check into the sorting device and a selected compartment, as controlled by the pickup device 101, in a manner not described herein.

As mentioned above, air is exhausted from the inside of the transport drum and the aliner drum.

To accomplish this, a tube from a source of vacuum is attached to a collar or flange 200 (Figs. 2 and 7), forming a coupling for the tube of the vacuum source. The collar 200 is formed on a box 201, secured to the main frame 105 by an airtight connection. The main frame 105 is provided with an opening 202, providing access to an air compartment 203 formed by a collar 204 supported by a plurality of studs 205 on the main frame 105. The collar 204 is flanged outwardly, as at 206, and bears against an air seal 207, such as felt. The inner plate 30 of the transport drum is spoked, thus providing openings for the air to be drawn from the interior of the transport drum 28.

The box 201 is formed with an extension 210 (Fig. 2), through which the vacuum is applied to the inside of the alining drum 100 by the passage of air through a semi-circular slot 211, in the main frame 105. The slot 211 communicates with the inside of a short cylinder 212 supporting the above mentioned bearing 104.

The cylinder 212 is provided with a flange 124, and a felt air seal 123 is mounted on the cylinder 212 between it and the bearing 104.

When the vacuum source is attached to the collar 200 in any well known manner, and the vacuum applied, the air is exhausted from the transport drum 28 through the compartment 203, and the space between the spokes of the plate 30 through the opening 202, box 201 and to the vacuum source. At the same time the air is exhausted through the box 201 by exhausting the air from the alining drum 100 through the semi-circular slot 211, which is in direct communication with the interior of the alining drum, through the inside of the cylinder 212. Thus, when the vacuum is applied the air is exhausted from both the transport drum 28 and the alining drum 100.

A paddle valve 215 is provided between the box 201 and the extension 210 to control the air pressure in the boxes.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt, where it is held by the air being pulled through the openings in the transport belt by said vacuum, an alining drum, a second transport belt passing around the alining drum, means to transfer the forms from the first transport belt to the second transport belt, a pick-up device, and means on the alining drum to move the forms into alined position in respect to the pick-up device.

2. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt where it is held by the air being pulled through the opening in the transport belt by said vacuum, an alining drum, a second transport belt passing around the alining drum, means to transfer the forms from the first transport belt to the second transport belt, a pick-up device, and means comprising a plurality of radially located arms mounted within the alining drum and projecting beyond the periphery thereof so as to engage the forms when moved around the alining drum by the second transport belt, to aline the forms in respect to the pick-up device.

3. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the transport drum and in the transport belt, said vacuum source withdrawing a form from the bottom of the stack of forms and transferring said form to the transport belt where it is held by the air being pulled through the openings in the transport belt by said vacuum, an alining drum, a second transport belt passing around the alining drum, means to transfer the forms from the first transport belt to the second transport belt, a pickup device, and means comprising a plurality of radially located arms, a bearing for supporting the arms, a stud carried by the framework of the machine, said bearing mounted on the stud at an angle to the face of the drum, the free ends of the arms projecting through the openings in the periphery of the drum, said angular mounting of the bearing causing the arms to project through said openings at progressively different locations in respect to the face of the drum, said arms individually moving across the periphery of the drum as the drum is rotated to aline the forms in respect to the picking device.

4. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt where it is held by the air being pulled through the openings in the transport belt by said vacuum, an alining drum, a second transport belt passing around the alining drum, means to transfer the forms from the first transport belt to the second transport belt, a pickup device, an alining surface on the drum, means comprising a plurality of flexible arms located radially within the alining drum, the free ends of the flexible arms projecting through the periphery of the alining drum, a support, and a bearing mounted on the support at an obtuse angle in respect to the face of the alining drum, said flexible arms being mounted on the bearing, said arms and bearing rotatable on the support by the alining drum by contact with the ends of the arms projecting through the periphery of the alining drum, whereby the free ends of the arms move toward the alining surface on the drum to shift and aline the forms in respect to the alining surface and said pickup device.

5. In a machine of the class described, the combination of a rotatable drum, a plurality of slits in the periphery of the drum to permit air to pass into the drum, a rotatable bearing mounted at an angle to the face of the drum, a plurality of flexible arms mounted on the bearing and movable therewith, the free ends of the arms projecting through the slits in the periphery of the drum, said arms mounted radially on the bearing to cause the free ends of the arms to extend at an angle across the face of the periphery of the drum, and means to rotate the drum whereby the arm and its supporting bearing are rotated with the drum and cause the free ends of the arm to move across the face of the periphery.

6. In a machine of the class described, the combination of a rotatable drum, a plurality of slits in the periphery of the drum to permit air to pass into the drum, a rotatable bearing mounted at an angle to the face of the drum, a plurality of flexible arms mounted on the bearing, and movable therewith, the free ends of the arms projecting through the slits in the periphery of the drum, said arms mounted radially on the bearing to cause the free ends of the arm to extend at an angle across the face of the periphery of the drum, means to rotate the drum whereby the arm and its supporting member are rotated with the drum and cause the free ends of the arms to move across the face of the periphery, a stop on the drum, a source of vacuum to draw air through the slits to thereby hold the record material on the drum, said arm, while moving across the drum, forcing the record material against the stop.

7. In a machine of the class described, the combination of a rotatable drum, a plurality of slits in the periphery of the drum to permit air to pass into the drum, a rotatable bearing mounted at an angle to the face of the drum, a plurality of flexible arms mounted on the bearing and movable therewith, the free ends of the arm projecting through the slits in the periphery of the drum, said arms mounted radially on the bearing to cause the free ends of the arms to extend at an angle across the face of the periphery of the drum, means to rotate the drum whereby the arm and its supporting bearing are rotated with the drum and cause the free ends of the arms to move across the face of the periphery of the drum, a stop on the drum, a source of vacuum to draw air through said slits to thereby hold a record material on the drum, said arms, while moving across the periphery of the drum forcing the record material against the stop, and a pick-up device located in respect to said stop, whereby the record material is alined with the pick-up device and forced against the stop by the arm.

8. In a machine of the class described, the combination of a rotatable drum, a plurality of slits in the periphery of the drum to permit air to pass into the drum, a rotatable bearing mounted at an angle to the face of the drum, a plurality of spring wire arms mounted on the bearing and movable therewith, the free ends of the arms projecting through the slits in the periphery of the drum, said arms mounted radially on the bearing to cause the free ends of the arms to extend at an angle across the face of the periphery of the drum, and means to rotate the drum whereby the spring wire arm and its supporting bearing are rotated with the drum and cause the free ends of the arms to move across the face of the periphery of the drum.

9. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum, and in the transport belt, said vacuum source withdrawing a form from the bottom of the stack of forms and transferring said form to the transport belt, where it is held by the air being pulled through the openings in the transport belt by said vacuum, a return belt adjacent the transfer belt and movable in an opposite direction, said forms passing between the transport belt, said return belt adapted to contact and return any form not held in intimate contact with the transport belt by vacuum, back into the hopper when more than one form is simultaneously fed from the stack, an alining drum, a transport belt passing around the alining drum, a pick-up device, and means on the alining drum to move the forms into alined position in respect to the pick-up device.

10. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt where it is held by the air being pulled through the opening in the transport belt by said vacuum, a return belt adjacent the transfer belt and movable in an opposite direction, said form passing between the transport belt and the return belt, said return belt adapted to contact and return any forms not in intimate contact with the transport belt, back into the hopper, an alining drum, a transport belt passing around the alining drum, means to transfer the form from the first transport belt to the second transport belt, a pick-up device, and means on the alining drum to move the forms into alined position in respect to the pick-up device.

11. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt where it is held by the air being pulled through the opening in the transport belt by said vacuum, a return belt adjacent the transfer belt and movable in an opposite direction, said forms passing between the transport belt and the return belt, said return belt adapted to contact and return any forms not in intimate contact with the transport belt, back into the hopper, an alining drum, a transport belt passing around the alining drum, a pick-up device, and means comprising a plurality of radially located arms mounted within the alining drum and projecting beyond the periphery thereof, so as to engage the forms when moved around the alining drum by the second transport belt to aline the forms in respect to the pick-up device.

12. In a machine of the class described, the combination of a hopper for receiving a stack of forms of various sizes, a transport drum adjacent the mouth of the hopper, a transport belt passing around the transport drum and past the mouth of the hopper, a source of vacuum within the transport drum, openings in the periphery of the drum and in the transport belt, said vacuum source withdrawing a form from the bottom of the stack of forms and transferring said form to the transport belt, where it is held by the air being pulled through the openings in the transport belt by said vacuum, a return belt adjacent the transfer belt and movable in an opposite direction, said forms passing between the transport belt and the return belt, said return belt adapted to contact and return any forms not in intimate contact with the transport belt back into the hopper, an alining drum, a transport belt passing around the alining drum, a pick-up device, means to transfer the form from the first transport belt to the second transport belt, and means comprising a plurality of radially located arms, a bearing for supporting the arms, a stud carried by the framework of the machine, said bearing mounted on the stud at an angle to the face of the drum, the free ends of the arms projecting through openings in the periphery of the drum, said angular mounting of the bearing causing the arms to project through said opening at progressively different locations in respect to the face of the drum, said arms individually movable across the periphery of the drum as the drum is rotated to aline the forms in respect to the pick-up device.

13. In a machine of the class described, the combination of a hopper for receiving a stack of forms of various sizes, a transport drum adjacent the mouth of the hopper, a transport belt passing around the transport drum, and past the mouth of the hopper, a source of vacuum within the transport drum, openings in the periphery of the drum and in the transport belt, said vacuum source withdrawing a form from the bottom of the stack of forms and transferring said form to the transport belt, where it is held by the air being pulled through the opening in the transport belt by said vacuum, a return belt adjacent the transfer belt and movable in an opposite direction, said forms passing between the transport belt and the return belt, said return belt adapted to contact and return any form not in intimate contact with the transport belt back ino the hopper, an alining drum, a transport belt passing around the alining drum, means to transfer the form from the first transport belt to a second transport belt, a pick-up device, and an alining surface on the drum, means comprising a plurality of flexible arms located radially within the alining drum, the free ends of the flexible arm projecting through the periphery of the alining drum, a support and a bearing mounted on the support at an obtuse angle in respect to the face of the alining drum, said flexible arms being mounted on the bearing, said arms and bearing rotatable on the support by the alining drum, by contacts with the ends of the arms projecting through the periphery of the alining drum, whereby the free ends of the arms move toward the alining surface on the drum to shift and aline the forms in respect to the alining surface and said pick-up device.

References Cited in the file of this patent

UNITED STATES PATENTS

| | | |
|---|---|---|
| 654,144 | Evans | July 24, 1900 |
| 2,259,672 | Waller | Oct. 21, 1941 |
| 2,767,982 | Noon | Oct. 23, 1956 |